United States Patent [19]
Raith

[11] Patent Number: 5,093,848
[45] Date of Patent: Mar. 3, 1992

[54] METHOD OF CONTROLLING THE FREQUENCY OF A COHERENT RADIO RECEIVER AND APPARATUS FOR CARRYING OUT THE METHOD

[75] Inventor: Alex K. Raith, Kista, Sweden

[73] Assignee: Telefonaktiebolaget L M Ericsson, Stockholm, Sweden

[21] Appl. No.: 469,082

[22] Filed: Jan. 23, 1990

[30] Foreign Application Priority Data

Jan. 26, 1989 [SE] Sweden ................................ 8900282

[51] Int. Cl.$^5$ .......................................... H04L 27/06
[52] U.S. Cl. ........................................ 375/97; 329/309
[58] Field of Search ................. 375/99, 57, 58, 15, 375/118, 39; 329/306, 307; 455/137, 206; 371/47.1, 46

[56] References Cited

U.S. PATENT DOCUMENTS

| | | | |
|---|---|---|---|
| 4,027,250 | 9/1977 | Lang | 375/13 |
| 4,138,644 | 2/1979 | Godard et al. | 375/86 |
| 4,151,491 | 4/1979 | McRae | 375/15 X |
| 4,227,152 | 10/1980 | Godard et al. | 375/14 X |
| 4,234,957 | 11/1980 | Tracey et al. | 375/86 |
| 4,370,749 | 1/1983 | Levy et al. | 375/97 |
| 4,466,108 | 8/1984 | Rhodes | 375/83 |
| 4,527,278 | 7/1985 | Deconche et al. | 375/97 |
| 4,578,080 | 3/1986 | Yasuda et al. | 375/118 X |

FOREIGN PATENT DOCUMENTS 0239153 9/1987 European Pat. Off.

OTHER PUBLICATIONS

Radio Test Performance of a Narrow Band TDMA System, Jan-Erik Stjernvall, Bo Hedberg and Sven Ekemark, Ericsson Radio Syst. AB pp. 1-6, IEEE Vehicular Tech. Tampa, Fla., Jun. 1987.
Adaptive Digital Phase Modulation, Torleiv Maseng og Odd Trandem, Telektronikk Nr 1, 1987, pp. 11-26.
Coded 8-DPSK Modulation with Differentially Coherent Detection-and Efficient Modulation Scheme for Fading Channels, Franz Edbauer, Inst. of Comm. Tech., DFVLR, pp. 42.2.1-42.2.4, 11/87.
Theory and Practice of Error Control Codes, Richard E. Blahut, Addison-Wesley Pub. Co., Chapter 12, 1983.
Modulation, Coding and Performance, Ulrich Langewellpott, AEG Olympia, Michael Reiner, AEG Olympia, 3b/1-3b-9, DCRC 10/88.

*Primary Examiner*—Benedict V. Safourek
*Assistant Examiner*—Tesfaldet Bocure
*Attorney, Agent, or Firm*—Burns, Doane, Swecker & Mathis

[57] ABSTRACT

The invention relates to a method and an arrangement for controlling the frequency of a radio-receiver which receives signal-sequences which have been subjected to interference and which include a synchronizing-sequence and a data-sequence. A signal-sequence is converted into signal-points intended for analysis. A Viterbi-analyzer is adapted to the prevailing interferences with the aid of the synchronizing-sequence. The data-sequence is Viterbi-analyzed through a large number of calculating stages to determine the bit-sequence of the data-sequence. A bit-sequence is extracted during the Viterbi-analysis, with a time-delay, subsequent to effecting a few calculating stages, and a corresponding extracted signal-point is calculated. The analysis-intended signal-point corresponding to the extracted signal-point is divided, time-delayed, and phase-compared with the extracted signal-point. Corresponding phase-comparisons are made with respect to consecutive signal-points in the data-sequence, and the angular magnitudes obtained in the phase-comparison are low-pass filtered and integrated to form an angle-shift signal (V). The analysis-intended signal-points are displaced angularly by the angle-shift signal (V) prior to the Viterbi-analysis.

13 Claims, 2 Drawing Sheets

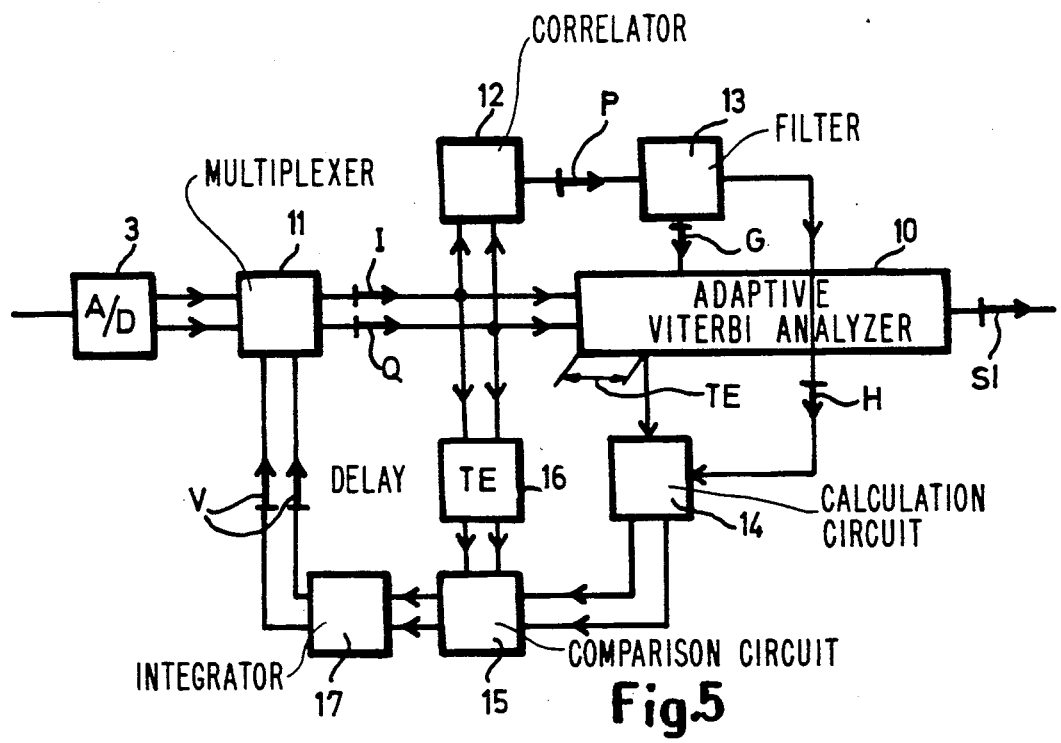
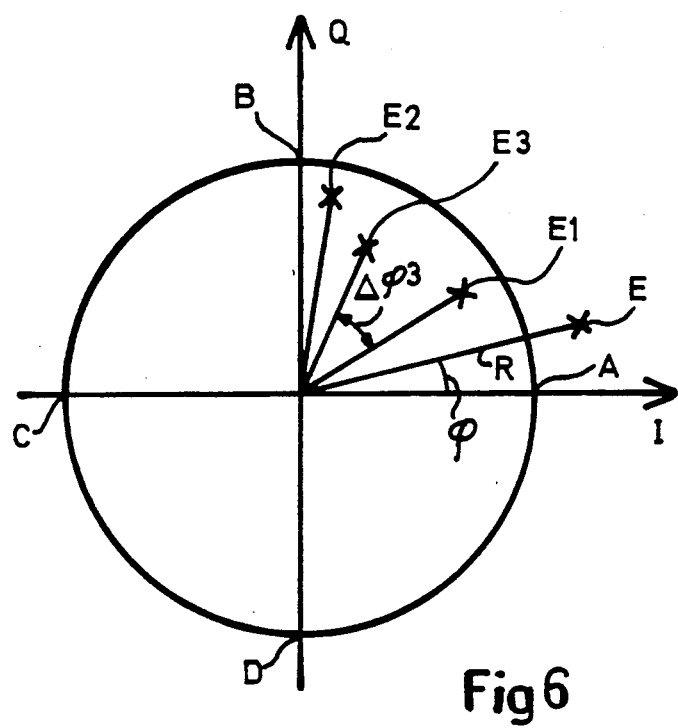

METHOD OF CONTROLLING THE FREQUENCY OF A COHERENT RADIO RECEIVER AND APPARATUS FOR CARRYING OUT THE METHOD

FIELD OF THE INVENTION

The present invention comprises a method of controlling the frequency of a coherent radio-receiver which receives, via a channel which is subjected to interferencies, signal-sequences which include at least one synchronizing-sequence and at least one data-sequence.

BACKGROUND OF THE INVENTION

In many radio transmission systems, for instance time-shared, TDMA-systems, it is important that the transmitter and the receiver are synchronized. It is also important that the local frequency generator of the receiver be locked accurately to the transmitter frequency, particularly in the case of coherent transmission systems. An arrangement for such a radio-transmission system is described in the article "Radio Test Performance of a Narrowband System", by Sjernvall, Hedberg and Ekemark, published in IEEE Vehicular Tech., Tampa, Fla., USA, June 1987.

The frequency error in the receiver where the receiver-frequency has been at least roughly set is estimated in a frequency-error calculating device, and a control processor generates a correction signal for each new transmitted signal sequence in accordance with the size of the correction obtained during the preceding signal sequence and in accordance with the estimated frequency error. The correction signal is sent to a controllable local oscillator, according to the aforesaid article a so-called frequency synthesizer, which is constructed to generate mixing signals, the frequencies of which are corrected in dependence on the control-processor signal. This signal is digital and in practice is converted to analogue form in a digital/analogue converter before being sent to the local oscillator. Consequently, the number of stages in which the oscillator output frequency can be adjusted is dependent on the number of binary bits which the converter is able to convert. When a relatively small and simple converter is used, either the maximum frequency swing from the local oscillator will be small or the frequency stages will be relatively large.

The transmitted signal can be subjected to interferences in systems of the aforesaid kind. These interferences or disturbances may, for instance, be in the form of an added noise-signal or in the form of multiple-path propagation due to repeated reflection of the signal against buildings, mountains etc.. This is often the case in mobile radio transmissions, as is described in an article published in the Norwegian technical journal Telektronikk Nr 1, 1987, Torleiv Maseng and Odd Trandem: "Adaptive digital phase modulation". The article describes a coherent receiver which incorporates an equalizer in the form of an adaptive Viterbi-analyser as equalizer. As mentioned in the aforegoing, the tranmitted signal similarly includes periodically recurring signal sequences which include a synchronizing sequence and a data sequence. The signals are frequency-mixed and converted in an analogue-digital converter, in the aforedescribed manner, and stored in a memory. The Viterbi-analyzer is adapted to the prevailing transmission characteristics of the channel with the aid of the synchronizing sequence, these characteristics being determined primarily by said multiple-path propagation. The data sequence is analyzed in the Viterbi-analyzer for the purpose of extracting the content of the original transmitted signal.

An article in IEEE/IEICE Global Communications Conference, Tokyo, Nov. 15-18, 1987 by Franz Edbauer: "Coded 8-DPSK Modulation with Differentially Coherent Detection—An Efficient Modulation Scheme for Fading Channels" describes a radio receiver equipped with a Viterbi-analyzer. This analyzer assists in controlling the frequency of a received signal. According to this article, the Viterbi-analyzer is set permanently and cannot be adapted to handle variations in channel conditions for instance.

A more detailed description of the Viterbi-algorithm applied in the Viterbi-analyzer is given in Richard E. Blahut: "Theory and practice of error control codes", chapter 12, Addison-Wesley 1983.

SUMMARY OF THE INVENTION

It is mentioned in the aforesaid article published in the journal Telektronikk that during signal transmission a small drift in frequency can occur, which is manifested in the form of a successive phase-shift of the received bits. When this phase-shift is small, no compensation is necessary. When the phase-shift reaches a given value, however, there is a danger that a decision-error will be made in the Viterbi-analyzer when analyzing the data sequence. The present invention utilizes the states which occur in the Viterbi-analysis to effect an adjustment of the phase of the signal intended for analysis in the Viterbi-analyzer. In this respect there is utilized a preliminary decision is made regarding data taken from the path-memory of the Viterbi-analyzer with a given time-delay. The extracted values are compared with the signal to be Viterbi-analysed, to achieve the necessary phase-adjustment.

BRIEF DESCRIPTION OF THE DRAWINGS

The invention will now be described in more detail with reference to an embodiment thereof and with reference to the accompanying FIGS. 1, to 7, of which

FIG. 5 is a block-schematic which illustrates the inventive radio receiver;

FIG. 6 illustrates a complex numeric coordinate system with signal points; and

DETAILED DESCRIPTION OF THE PREFERRED EMBODIMENTS

Figure 1:
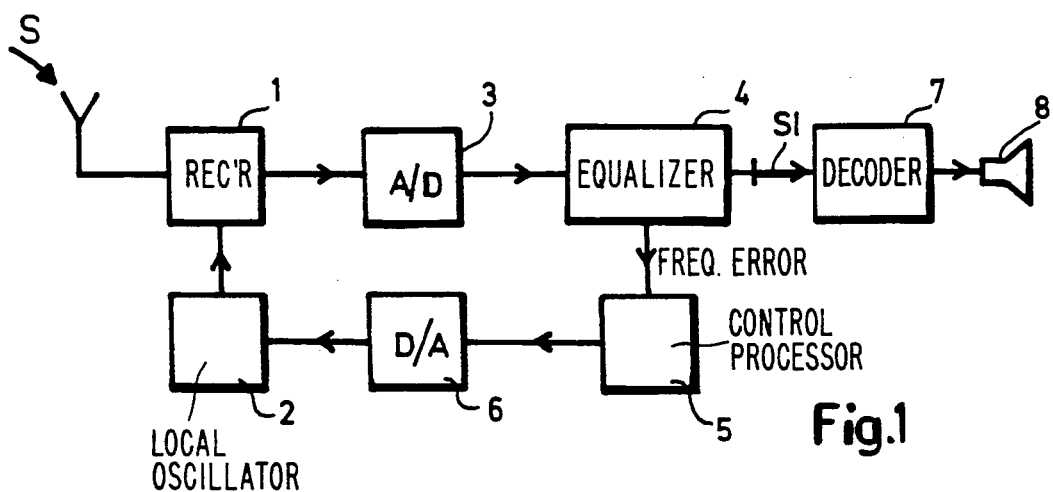
FIG. 1 is a block-schematic illustration of a radio receiver.

FIG. 1 illustrates schematically a radio receiver intended for a system operating with time-shared transmission of information in digital form. A received signal S is mixed down in a known manner in a receiver stage 1 having a low-frequency and an intermediate-frequency stage. The receiver stage 1 receives a high-frequency and an intermediate-frequency signal from a local oscillator 2, for instance a frequency synthesizer.

The mixed-down signal, the baseband signal, is converted in an analogue-digital converter and stored in a memory in a buffer 3. A signal is sent from the buffer to a block 4 which includes an equalizer and means for calculating a frequency error. This means may consist in a calculating unit in which the frequency error is calculated on the basis of the successive change in phase-position of the received signal in relation to the anticipated phase-positions of the signal. Data relating to the frequency error is supplied to a control processor 5 which calculates a control signal for correcting the frequency of the local oscillator. This control signal is digital and is converted in a D/A-converter 6 prior to being sent to the local oscillator 2. The mixing signal produced in the converter is changed in small increments, because the D/A-converter 2 will convert only a limited number of bits. This results in a residual frequency error which is liable to cause errors in the transmitted signal. Such a frequency error can also occur in receivers equipped with more accurate frequency-control facilities.

The block 4 produces an output signal S1 which corresponds to the received signal S. The signal S1 is sent to a block 7 which includes a channel-decoder and a speech-decoder, and means for converting the decoded signal S1 to an analogue speech-signal. The speech signal is sent to a loudspeaker 8.

Figure 2:
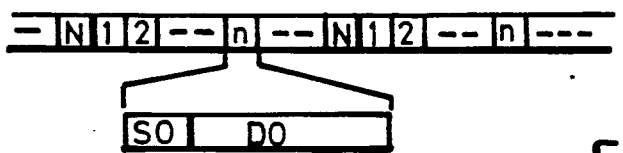
FIG. 2 is a diagram which illustrates a format for signal sequencies in a time-sharing transmission system.
Figure 3:
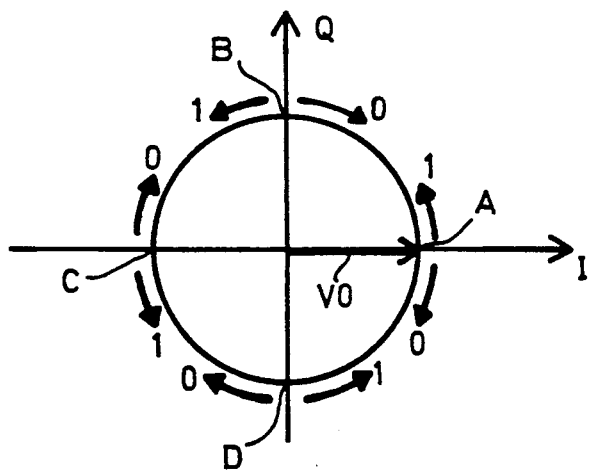
FIG. 3 illustrates a complex numeric coordinate sytem with signal modulation.

Radio receivers may be included in a system that incorporates time-shared signal transmission having N time-separated channels as illustrated in FIG. 2. Each user is assigned a given time slot D during which a signal frequency is transmitted. Each signal frequency includes a synchronizing-sequence S0 and data-sequence D0 which contains the information signal. The signals in the signal sequences relevant in the case of the present invention are coherent, and an example of one such coherent signal is illustrated in FIG. 3. The signal is represented by a vector V0 in a complex numeric cooridnate system with the real axis referenced I and the complex axis referenced Q. A transmitted "1" corresponds to a phase-rotation through one quarter of a revolution in a positive directional sense, whereas a transmitted "0" corresponds to a phase-rotation through one quarter of a revolution between the points A, B, C and D in a negative directional sense. The vector V0 can be given in a conventional manner, by its real and imaginary parts, or in polar coordinates in terms of its length and its angle to the positive I-axis.

Figure 4:
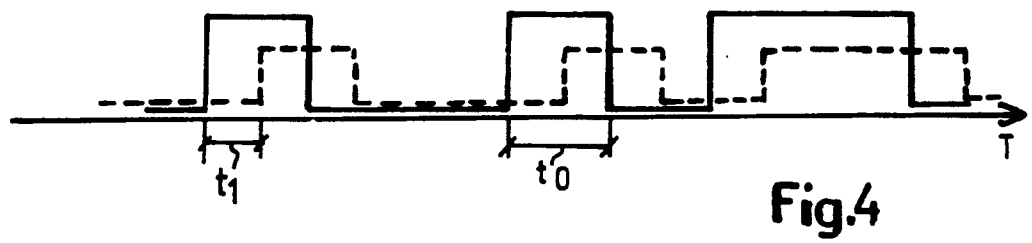
FIG. 4 is a diagram illustrating time-displaced bit-sequencies.

Each transmitted "1" and "0" takes up a given time-interval in the signal sequence, the so-called bit time. FIG. 4 illustrates schematically a signal diagram in which T identifies time and t0 is the bit time. As before mentioned, the transmitted signal can reach the receiver via a direct path betwen the transmitter and the receiver and via one or more paths with signal-reflection against mountains, buildings etc.. The reflected signals travel a longer path than the direct signal, which results in a time-shift t1 between direct and reflected signals. The time-shift t1 may extend to several bit-times and cause intersymbol interference of the received signal S according to FIG. 1. The shorter the bit-time, the more bits that are accommodated within the time shift and the more serious the intersymbol interference.

The receiver of the FIG. 1 embodiment includes an equalizer 4. The incoming mixed and digitalized signal is processed in the equalizer 4 to extract the content of the originally transmitted signal. In the case of an inventive receiver constructed in accordance with FIG. 5, the equalizer comprises, in a known manner, an adaptive Viterbi-analyzer 10 which is used, in accordance with the present invention, to control the frequency of the signal entering the Viterbi-analyzer. The use of a Viterbi-analyzer as an adaptive equalizer is described in the aforesaid article published in the journal Telektronikk and will be outlined summarily herebelow. The Viterbi-analyzer is connected to the buffer 3 shown in FIG. 1 via a multiplier 11. The buffer 3 is also connected to a correlator circuit 12 which, in turn, is connected to a filter circuit 13. The output of the filter circuit 13 is connected to the Viterbi-analyzer. 10. The Viterbi-analyzer 10 is provided with a desired number of states $M=2^m$, where $m=2,3 \ldots$ The Viterbi-analyzer 10 is adapted to the channel states which prevail during a signal sequence, in the following manner. According to FIG. 2, the received signal sequence includes the synchronizing sequence S0, which is received by the correlator 12 from the buffer 3. The known synchronizing-sequence is stored in the correlator and the correlator compares the bit-pattern of the known synchronizing-sequence with the wave-form of the received synchronizing-sequence. The correlator sends a signal P to the filter circuit 13, in which a filter is built-up such as to correspond to the transmission properties of the channel during the duration of the received signal-sequence, so-called channel estimation. The Viterbi-analyzer 10 receives the data-sequence D0 from the buffer 3, and with the assistance of a signal G from the filter circuit 13, determines the content of the data-sequence D0 through a large number of traditional Viterbi-calculations. Assume, for instance, that one of the signal points in D0 received by the Viterbi-analyzer 10 lies at a point E1, as illustrated in FIG. 6. The position of this point is contingent, inter alia, on the degree of accuracy to which transmitter and receiver are synchronized. Subsequent to full analysis in the Viterbi-analyzer 10, there is determined a final bit sequence which is transmitted with the signal S1 for conversion to a speech signal in accordance with FIG. 1. For the purpose of obtaining a better understanding of the invention, it may be instructive to imagine the bit sequence as being converted to a signal-point E2.

As before mentioned, the received bits may undergo a successive phase shift, which in unfavourable circumstances may be so large as to render the possibility of referring the bits to any of the points A, B, C or D in FIG. 3 improbable. This problem is solved in accordance with the invention by utilizing the states in the Viterbi-analyzer 10 for calculating a signal point and by controlling the frequency of the received signal-sequence with the aid of this calculated signal point. This frequency control corresponds to a successive shift in the phase-position of the received signal points.

The final bit-sequence according to the above is determined by means of a large number of calculating stages in the path-memory of the Viterbi-analyzer 10. The number of calculating stages is contingent on the length of the path-memory selected. These calculations take a relatively long time to carry out, i.e. many bit-times, since a large number of bits must be fed into the path-memory before the calculations can be terminated. Although the use of the position of the signal-point E2 for frequency-control purposes introduces a relatively long time-delay, the use of this signal-point nevertheless lies within the scope of the present invention.

According to one advantageous embodiment of the invention, subsequent to a few calculating stages in the Viterbi-analyzer path-memory, bits which correspond to a time-delay TE are extracted from the Viterbi-analyzer 10 for the purpose of obtaining a relatively small time delay. It is assumed in this respect that there are extracted m+1 bits, corresponding to one state, and one bit for the relevant transition. The bits are extracted by a calculation circuit 14 which obtains the filter 13 outputs values via a signal H. The extracted bits are converted to a signal-point E3 according to FIG. 6, with the aid of the filter values. The signal-point E3 forms an estimation of the final positions of the signal-point in the point E2, and the estimated position E3 differs from the position of the received signal-point E1 by an angle $\Delta\phi 3$. This estimated position E3 is compared with the received value E1 in a comparison circuit 15. This circuit 15 obtains the position of the estimated signal-point E3 from the calculating circuit 14, and also the position of the received signal-point E1 upstream of the input of the Viterbi-analyzer 10. The values relating to the position of the signal-point E1 are delayed in the time-interval TE in a delay circuit 16, so as to enable these values to be compared with the values of the estimated signal-point E3 delayed in the Viterbi-analyzer 10. As described above, signal-points are extracted sequentially from the data-sequence D0, and the respective received and estimated positions of these signal-points are compared successively in the comparison circuit 15. The values thus obtained, corresponding to the angle $\Delta\phi 3$, are processed in a filter-and-integrating circuit 17 to form an angle-shift signal V.

This signal-processing stage is carried out in accordance with known technical control methods and includes low-pass filtration and integration processes and may also include prediction of the angle-shift signal V. Low-pass filtration is carried out for the purpose of reducing the influence of rapidly-varying interference caused by noise, for instance. The low-pass filtered and integrated values V are passed to the multiplier 11 in which complex multiplication is carried out. This complex multiplication corresponds to a successive shift in the angles of the signal-points and results in an adjustment to the frequency of the signal passed to the Viterbi-analyzer, the data-sequence D0. The final value of V passed to the multiplier 11 upon completion of a whole signal-sequence S0, D0 can be stored and subsequently used when calulating a start-value for frequency-control in the next-arriving signal-sequence in the time-slot of the user with number n. If the signal-point E2 is used for calculating the angle-shift signal V, a relatively slow frequency control is obtained, and the time interval TE corresponds to the time taken to complete a Viterbi-analysis of the received signal-point E1.

It should be noted that in the example above, the signal-points have been given in a complex speech plan with the coordinates I,Q. This has been marked in FIG. 5 by connecting the circuits with double signal-paths, one for each coordinate. The signal-points, for example the signal-point E in FIG. 6, can be given by a radius R and an angle $\phi$. If signal-processing is effected with these magnitudes, a circuit corresponding to the multiplier 11 will consist of an addition circuit for adding the low-pass filtered and the integrated value, corresponding to the angle-shift signal V, directly to the phase-positions of the signals.

The aforedescribed inventive embodiment can be utilized in the transmission of signals as soon as a Viterbi-analyzer can be used. Examples of those modulation forms which can be used include QAM-modulation, Qadrature Amplitude Modulation, or GMSK-modulation, Gaussian Minimum Shift Keying.

GMSK-modulation is described in more detail in Conference Proceedings, Digital Cellular Radio Conference, Oct. 12-14 1988, Hagen Westphalia FRG, in an article by Ulrich Langewellpott: "Modulation, Coding and Performance".

There has been described in the aforegoing an inventive arrangement for controlling the phase of the signal arriving at the Viterbi-analyzer. The invention also includes a frequency-control method for application in the aforedescribed arrangement. An inventive method includes the following known stages:

The received signal-sequence S is mixed-down with a known frequency to form a baseband signal. This signal is converted in an analogue/digital converter to signal points (I,Q) which are then stored. The received signal is subjected to interference during signal-transmission e.g. due to multiple-path propagation, and the data speed is relatively high, and hence intersymbol interference can occur. Consequently, the received signal is equalized, which is effected, in accordance with the inventive method, with the aid of a known Viterbi-algorithm including a path-memory of desired length. This algorithm is adapted to prevailing channel conditions in a known manner, with the aid of the synchronizing-sequence S0. The transmitted data-sequence D0 is analyzed in a Viterbi-analyzer in a relatively large number of calculating stages determined by the length of the path-memory, so as to extract the bit-sequence of the data sequence. The invention includes the following further stages:

Subsequent to carrying out a number of calculating stages on the received signal-point E1, a bit-sequence is extracted. The number of calculating stages is restricted by the length of the path-memory and the bit-sequence is determined by the path selected in the path-memory. The extracted signal-point E3 is calculated, which corresponds to the extracted bit-sequence. The extracted signal-point E3 is delayed by the time-interval TE in relation to the received signal-point E1, due to the fact that the signal-points arrive in a given rythmic sequence for Viterbi-analysis. The received signal-point E1 is branched-up prior to the Viterbi-analysis and the branched signal-point E1 is delayed by the time-interval TE. This state is compared with the state of the extracted signal-point E3 and the angle magnitude $\Delta\phi 3$ corresponding to the phase-difference of the signal points is calculated. A sequence of angle-magnitudes for consecutive signal-points after E1 is calculated in a similar manner. The angle-magnitudes are processed by a process which includes low-pass filtration and integration, such as to form a shift signal, the angle-shift signal V, by means of which the angle of the incoming signal-points is displaced prior to the Viterbi-analysis.

According to one preferred method, the signal-point E1 is subjected to a few calculating stages prior to extracting the bit-sequence. This results in a short time-interval TE and a relatively rapid frequency control.

Figure 7:
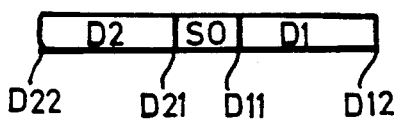
FIG. 7 is a diagram which illustrates a further format for signal sequencies.

A format for the transmitted signal-sequence having a synchronizing sequence S0 and a subsequent data-sequence D0 has been described above with reference to FIG. 2. In this format, the synchronizing-sequence S0 is located in the centre of the signal-sequence and surrounded on either side by data-sequencies D1 and D2, as illustrated in FIG. 7. An inventive receiver can be constructed so that the frequency of said receiver will be controlled in the following manner upon demodulation of this latter signal-sequence.

The Viterbi-analyzer is adapted through the synchronizing-sequence S0, in the aforedescribed manner. Demodulation of D1 commences at a point D11 and terminates at a point D12. Demodulation of D2, which continues thereafter, commences at a point D21 and terminates at a point D22. Angles which correspond to $\Delta\phi3$ for the data-sequence D1 are herewith calculated successively, and the angles are filtered and integrated in the aforesaid manner. Corresponding calculations are then made with respect to the data-sequence D2, wherein the final-value for the angle-shift signal in D1 can constitute the start value for D2. During the processing of a signal-sequence, it is also possible to adapt successively the filter-constants in the filter-and-integrator circuit 17. This adaptation can be effected subsequently, as the number of analyzed signal-points increases and the value of the angle-shift signal V is changed. As before mentioned, the final value of the angle-shift signal in D2 for the terminated signal-sequence can be used for calculating a start-value for the angle-shift signal in the next-following signal-sequence. With respect to the filter constants, the value of the angle-shift signal V obtained for a signal-sequence can also be used to adapt the filter-constants in the next-following signal-sequence. It should be noted that when the transmitted signal-sequence has the format illustrated in FIG. 7, it is necessary to store the received signal in a memory, suitably subsequent to A/D-conversion. A signal having the format illustrated in FIG. 2 need not be stored.

In the aforedescribed exemplifying embodiments, the transmitted signal-sequence S0, D0 has been binary-modulated, as described with reference to FIG. 3. The Viterbi-analyzer 10, used for demodulating the signal-sequence, has two possible transitions between the states, corresponding to the two levels in the binary code. The invention can also be applied when the transmitted signal-sequence has several modulation levels, which is often the case when the signal is modulated in accordance with said QAM-modulation. The Viterbi-analyzer, which in this case is used for demodulation and the inventive frequency-control, has several possible transitions between the states. More specifically, the number of transitions is equal to the number of modulation levels of the selected modulation form.

The invention has been described in terms of specific embodiments to facilitate understanding. The above embodiments, however, are illustrative rather than limitive. It will be readily apparent to one of ordinary skill in the art that departures may be made from these specific embodiments shown above without departing from the essential and spirit and scope of the invention. Therefore, the invention should not be regarded as being limited to the above examples, but should be regarded instead as being fully commensurate in scope with the following claims.

I claim:

1. A method for controlling the frequency of a coherent radio receiver which receives signal sequences, comprising:
   converting a received signal sequence to a baseband wherein said received signal sequence further comprises at least one synchronizing sequence and at least one data sequence signal;
   representing said baseband signal as a plurality of received signal points;
   adapting a Viterbi-analyzer to prevailing channel interference signals using said synchronizing sequence;
   analyzing said received signal points using plural calculating stages in said adapted Viterbi-analyzer to determine a final bit sequence; and
   correcting the phase of said received signal points, including:
      extracting preliminary bit decisions from said Viterbi-analyzer corresponding in time to one of said received signal points,
      converting said preliminary bit decisions into a preliminary estimated signal point,
      comparing said received signal point with said preliminary estimated signal point to generate a phase difference,
      calculating an associated phase compensation value for said received signal point based on said phase difference, and
      displacing subsequent received signal points based on said phase compensation value.

2. The method according to claim 1, wherein said comparing step includes delaying said received signal points by an amount based on a time delay associated with said extracting step.

3. The method according to claim 1, said calculating step further comprising:
   low-pass filtering said compensation value with selected frequency filter constants, and
   integrating said filtered value to form an angular shift signal, wherein said compensation value corresponds to said angular shift signal.

4. The method according to claim 1, wherein said bit sequence is determined subsequent to effecting several of said calculating stages prior to finally determining said received bit sequence corresponding to said received signal points.

5. The method according to claim 3, wherein said frequency filter constants are modified successively depending on the number of signal points analyzed during said low-pass filtering step.

6. The method according to claim 3, wherein upon completion of analysis of a current signal sequence, a current angular shift signal is used as an initial value for a subsequent angular shift signal in an analysis of a subsequent signal sequence.

7. The method according to claim 3, wherein said low-pass filtering step includes:
   calculating said filter constants depending on the value of said angular shift signal of a preceding signal sequence.

8. The method according to claim 3, wherein said signal sequence includes an initial data sequence, a synchronizing sequence, and a further data sequence.

9. A system for controlling the frequency of a coherent radio receiver which receives signal sequences including at least one synchronizing sequence and at least one data sequence over a channel subjected to interference, comprising:
   a receiver for receiving and converting a received signal sequence to a baseband signal;
   converter means for converting said baseband signal into received signal points;
   a Viterbi-analyzer, connected to said converter means, including a desired number of states in a path memory of a desired length and means for processing said received signal points using a plurality of calculating stages to determine a final bit sequence;

means for adapting said Viterbi-analyzer to prevailing interference signals in said channel based on said synchronizing sequence; and means for correcting the phase of said received signal points, including:

means for extracting preliminary bit decisions from said Viterbi-analyzer corresponding in time to one of said received signal points, means for converting said preliminary bit decisions to a corresponding preliminary estimated signal point, means for comparing said received signal point with said preliminary estimated signal point to generate a phase difference, means for calculating an associated phase compensation value for said received signal point based on said phase difference, and means for displacing subsequent received signal points based on said phase compensation value.

10. The system according to claim 9, further comprising:

means for delaying said received signal points by an amount based on a time delay associated with the extraction of said preliminary bit decisions.

11. A system according to claim 9 further comprising:

filtering means for low-pass filtering said phase compensation value; and integrating means for integrating said low-pass filtered signal to generate an angular shift signal, wherein said displacing means angularly displaces said received signal points based on said angular shift signal.

12. A system according to claim 9, wherein said extracting means extracts said preliminary bit decisions from said path memory subsequent to effecting several calculating stages in said path memory and prior to final determination of said bit sequence of said data sequence.

13. A system according to claim 9, wherein said adapting means further comprises:

delay means, connected to said generating means, for delaying said received signal points a predetermined amount of time.

* * * * *